United States Patent [19]

Archer et al.

[11] Patent Number: 4,831,385

[45] Date of Patent: May 16, 1989

[54] VACUUM TRAY FLUID-JET START-UP SYSTEM

[75] Inventors: Timothy H. V. Archer; Bruce W. Halliday, both of Centerville, Ohio

[73] Assignee: Burlington Industries, Inc., Greensboro, N.C.

[21] Appl. No.: 108,005

[22] Filed: Oct. 14, 1987

[51] Int. Cl.[4] .......... G01D 15/18

[52] U.S. Cl. .......... 346/1.1; 346/75; 346/140 R

[58] Field of Search .......... 346/1.1, 75, 140 R; 209/579

[56] References Cited

U.S. PATENT DOCUMENTS

| | | | |
|---|---|---|---|
| 3,661,304 | 5/1972 | Martinez et al. | 222/394 |
| 3,701,998 | 10/1972 | Mathis | 346/75 |
| 3,761,953 | 9/1973 | Helgeson | 346/75 |
| 3,891,121 | 6/1975 | Stoneburner | 222/1 |
| 3,970,222 | 7/1976 | Duffield | 222/148 |
| 3,974,508 | 8/1976 | Blumenthal | 346/140 R |
| 4,042,937 | 8/1977 | Perry et al. | 346/1.1 |
| 4,081,804 | 3/1978 | Van Breemen et al. | 346/75 |
| 4,170,016 | 10/1979 | Geil | 346/140 R |
| 4,266,231 | 5/1981 | Drago et al. | 346/75 |
| 4,305,079 | 12/1981 | Mix, Jr. | 346/75 |
| 4,314,264 | 2/1982 | Bok et al. | 346/140 R |
| 4,361,400 | 11/1982 | Gray et al. | 356/23 X |
| 4,367,479 | 1/1983 | Bower | 346/140 R |
| 4,376,283 | 3/1983 | Bower | 346/140 R |
| 4,410,900 | 10/1983 | Terasawa | 346/140 R |
| 4,518,973 | 5/1985 | Tazaki | 346/140 R |
| 4,528,996 | 7/1985 | Jones | 134/104 |
| 4,591,873 | 5/1986 | McCann et al. | 346/75 |

FOREIGN PATENT DOCUMENTS

| | | | |
|---|---|---|---|
| 58-194568 | 11/1982 | Japan | 400/126 |

*Primary Examiner*—E. A. Goldberg
*Assistant Examiner*—Gerald E. Preston
*Attorney, Agent, or Firm*—Nixon & Vanderhye

[57] ABSTRACT

A tray for a fluid-jet printing device for starting fluid-jet streams issuing from an orifice plate in a direction substantially perpendicular to the orifice plate. The tray includes an elongated box-like structure movable between various positions, including a sealing position below the orifice plate for drawing a vacuum through the orifice plate and facilitating flow of fluid from a plenum chamber above the orifice plate through the orifice plate for start-up. The tray is provided with backlighting such that, upon movement of the tray into a second position, the fluid streams issuing from the orifice plate may be visually observed against the backlighting to ensure proper start-up. Thereafter, the tray is moved to subsequent positions enabling location of the charging and deflection electrodes and droplet catcher structure below the orifice plate, as well as the substrate on which the printing will be effected.

23 Claims, 2 Drawing Sheets

VACUUM TRAY FLUID-JET START-UP SYSTEM

BACKGROUND AND SUMMARY OF THE INVENTION

The present invention relates to the field of non-contact fluid marking devices commonly known as "ink-jet" or "fluid-jet" devices. More particularly, the present invention relates to apparatus and methods for starting the flow of fluid through the orifice plate of a fluid-jet device in a manner such that the fluid filaments will issue from the orifices substantially perpendicular to the orifice plate and without interference with one other.

Fluid-jet printing devices in and of themselves are well known. Typically, prior fluid-jet printing devices provide a linear array of fluid-jet orifices formed in an orifice plate. Filaments or streams of pressurized marking fluid (e.g., ink, dye, textile fabric finishes, etc.) are caused to issue through the orifices which are supplied with fluid from a fluid supply plenum forming part of a fluid distribution bar. An individually-controllable electrostatic charging electrode is disposed downstream of the orifice plate along the so-called "drop formation zone." In accordance with well-known principles of electrostatic induction, the fluid filament is caused to assume an electrical potential opposite in polarity and related in magnitude to the electrical potential of its respective charging electrode. When a droplet of fluid is separated from the filament, the induced electrostatic charge is then trapped on and in the droplet. Thus, subsequent passage of the charged droplet through an electrostatic field having the same polarity as the droplet charge will cause the droplet to be deflected away from a normal droplet path and toward a droplet catching structure. Uncharged droplets, on the other hand, proceed along a normal path and are eventually deposited upon a substrate.

It will be appreciated that the orifice plate has a linear array of very small orifices. The orifices may exceed over up to 1.8 meters or more and have diameters in the range, for example, of about 0.0013–0.01 inch. The orifices may be very closely spaced, along the orifice plate, for example, on the order of 72–200 per inch. With orifices of this size and number (i.e., at 200 to the inch, a 1.8 meter plate has 14173 orifices) disposed along the length of the orifice plate, initial "start-up" of fluid flowing through this extended multi-orificed array has long been a problem. It should be understood that the problem is attendant start-up of the apparatus. Once a filament is formed properly, it rarely degrades. Typically, during start-up of the apparatus, pressure cannot be increased fast enough in the supply of fluid to the plenum chamber above the orifice plate to assure the formation of stable fluid filament streams issuing through the orifice plate in their intended directions, although once properly formed, the filaments are maintained by the steady state fluid pressure. That is, it is desirable that the fluid streams issue from the orifice plate in a direction generally perpendicular to the orifice plate such that each stream does not interfere with adjacent streams or otherwise deviate from the intended straight downward path. When one or more of the fluid streams issue from the orifice plate in other than straight formations, i.e., perpendicular to the orifice plate, a wetting of the orifice plate may occur. Such wetting could deleteriously affect the meniscus of the fluid on the underside of the plate, causing it to disturb the filament formation. This causes substantial difficulties in and prevents obtaining a clear unidirectional curtain of the fluid streams. Typically, this has been overcome in a very tedious manual, orifice-by-orifice, correction process.

Start-up of fluid-jet devices is a well-recognized problem, as shown by the opening two columns of U.S. Pat. No. 4,314,264. One attempted solution to this problem provided for the introduction of fluid into one end of a fluid distribution bar, with air being introduced at the other end of the bar. This was an effort to introduce high pressure within the plenum above the orifice plate cavity to cause the moving wall of fluid to pass down the bar from the fluid entrance to the air entrance in such manner that a sufficient pressure head would develop to cause the issuance of straight fluid streams through the orifices without wetting the plate. It was found, however, that the pressure was inadequate to accomplish that end. Pressurizing the fluid chamber to a greater extent risked damage to the equipment. Also, pressure increases have been found to be particularly ineffective where the geometry of the fluid cavity is not simple and smooth.

One source of the problem is the formation of an air bubble within the confines of the orifice through the orifice plate. In certain orifice plates, the inner and outer surfaces of the plate have inwardly projecting lips or ridges surrounding each orifice. Air bubbles may be formed in the voids between the lips and are trapped during start-up, causing the fluid streams to form at an angle other than perpendicular to the plate. Also, the compressibility of bubbles causes variations in localized pressure, leading to jet instabiliy.

According to the present invention, start-up is accomplished by applying a vacuum to the downstream or fluid filament side of the orifice plate to initially draw air and subsequently the fluid from the fluid supply plenum through the orifice plate. To accomplish this, a vacuum tray is placed under the fluid-jet printing head in a first position sealing the underside of the orifice plate structure outward of the orifices, preferably sealing against the clamping structure for the orifice plate. A vacuum is then drawn in the tray to draw air from the plenum through the orifice plate into the tray. Fluid is then introduced into the fluid distribution bar to fill the plenum and fluid streams issue from the orifice plate under the pressure of the fluid in the plenum and the vacuum pressure applied by the vacuum tray. Since the fluid distribution bar is evacuated prior to the introduction of fluid, bubble formation is less likely than in pressurized situations and any bubbles that are formed are pulled out of the bar by the vacuum.

An important element of the apparatus hereof distributes the vacuum pressure along the orifice plate and locates it just opposite the orifices to provide straight, normal-to-orifice plate filaments. A particular feature of the present invention resides in the use of a tray which has backlighting along one side thereof. Thus, after the vacuum has been applied and the fluid streams started, the tray can be spaced from the orifice plate into a second position such that the fluid streams can be visually observed against the backlight. The tray in its second position is, however, as close to the orifice plate as possible consistent with such visual observation such that any fluid streams issuing from the orifice plate in a non-straight condition (i.e., a condition where the streams lie at an angle other than perpendicular to the orifice plate) will still be caught by the tray. If the fluid streams are issuing properly, i.e., straight, from the orifice plate, and a good start-up condition is obtained, the tray can be lowered to another, or third position. In this position, the tray is located to enable the charging and deflection electrodes to be swung into position along the underside of the orifice plate while the tray continues to catch the fluid streams issuing from the orifice plate. Once the electrodes and catcher structure are in position, voltages may then be applied to the electrodes to obtain a "full catch" condition wherein all of the droplets are charged and deflected to the catcher structure. In this manner, all droplets are diverted to the catcher structure and none of the droplets are discharged into the tray as it lies in its third position. The tray may then be moved to a fourth, out-of-the-way, position such that the substrate, for example, textile materials normally carried on rolls, can be disposed below the orifice plate and printing commenced.

Accordingly, in accordance with the present invention, there is provided, in a fluid-jet printing device of the type having an orifice plate for generating an array of droplet streams for deposition on a substrate, apparatus for starting the flow of fluid droplet streams through the orifice plate comprising means defining a chamber and a margin about the chamber, the chamber-defining means being movable between a first position having its margin sealing about the orifice plate structure for receiving droplet streams flowing through the orifice plate and a second position spaced from the orifice plate. A vacuum is applied to the chamber when the chamber-defining means lies in its first position to draw fluid from the opposite side of the orifice plate through the orifices into the chamber.

Preferably, the chamber-defining means constitutes an elongated tray. Backlighting is provided on the tray for backlighting the area between the tray and the orifice plate when the tray lies in its second position spaced from the orifice plate. This enables visual observation of the fluid droplet streams and the direction of their issuance from the orifice plate while the tray remains closely spaced from the orifice plate in a manner to catch any fluid streams issuing from the orifice plate in directions other than perpendicular thereto.

In a further aspect of the present invention, there is provided a method for starting the flow of fluid droplet streams through the orifices of the orifice plate, including the steps of providing an elongated fluid droplet catching tray in a first position adjacent the underside of the orifice plate structure and in sealing engagement about the orifices of the orifice plate so that all orifices open into the tray, applying a continuous vacuum to the tray to draw fluid from the opposite side of the orifice plate through the orifices into the tray and moving the tray into a second position spaced from the orifice plate.

Accordingly, it is a primary object of the present invention to provide novel and improved apparatus and methods for starting a fluid-jet apparatus in a manner which substantially ensures the initial issuance of fluid droplet streams from the orifice plate in proper direction whereby the desired curtain of droplets may be formed.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present preferred embodiment of the invention, an example of which is illustrated in the accompanying drawings.

Figure 1:
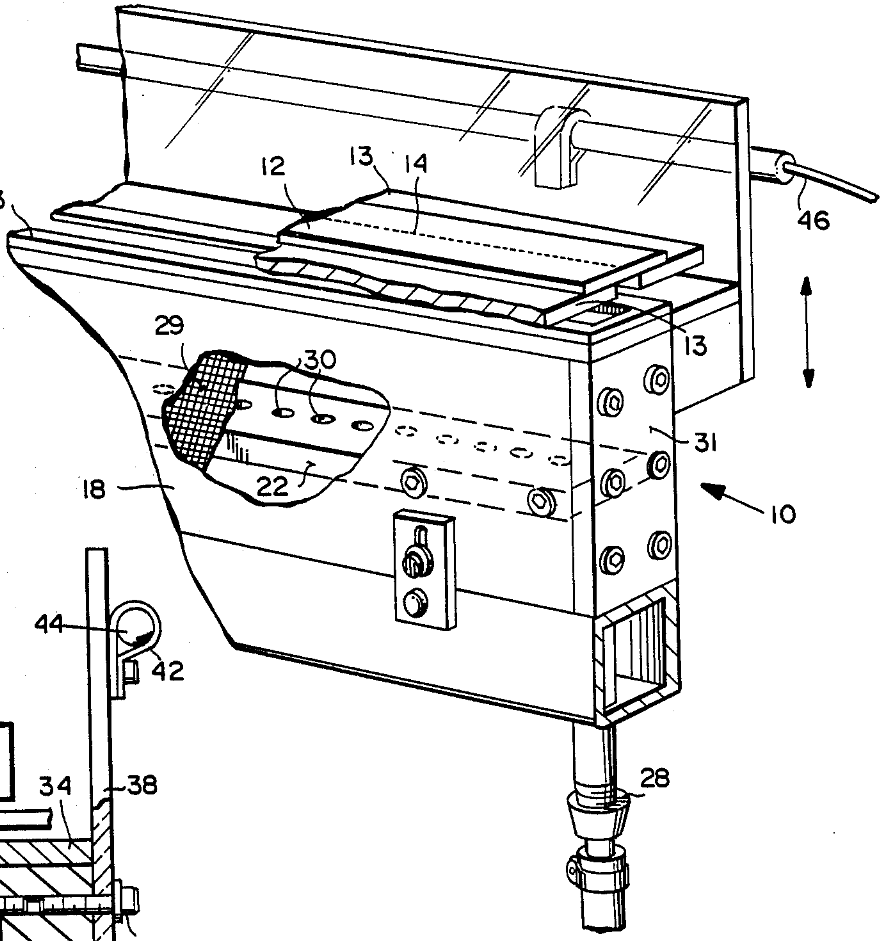
FIG. 1 is a fragmentary perspective view of a vacuum tray constructed in accordance with the present invention for use in conjunction with a fluid-jet printing device and illustrating the tray in a position spaced below the orifice plate structure shown detached from the fluid distribution bar to which it is usually mounted.
Figure 2:
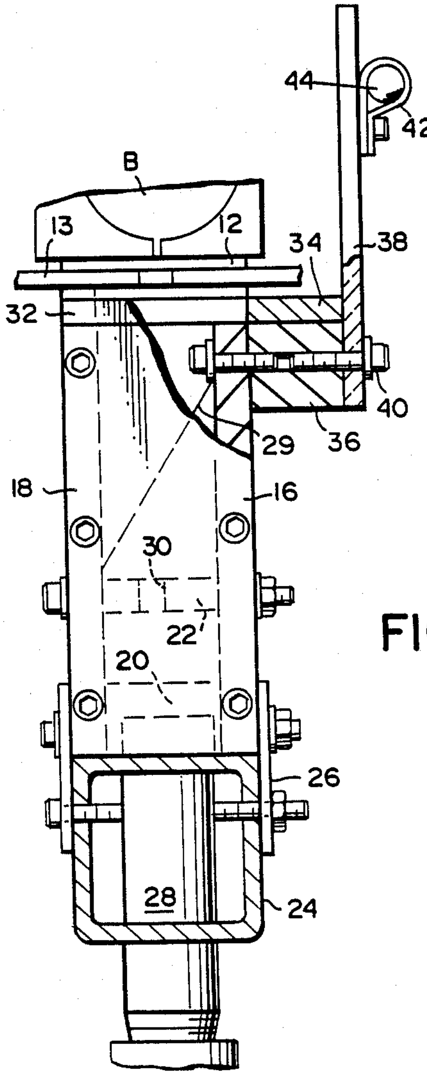
FIG. 2 is an end elevational view thereof with parts broken out and in cross-section.

Referring now to FIGS. 1 and 2, there is illustrated a start-up tray, generally designated 10, and constructed in accordance with the present invention. As part of a fluid-jet printing device, there is provided orifice plate structure including an orifice plate 12 and clamping structure 13 for retaining orifice plate 12 against the underside of a fluid distribution bar B. In FIG. 2, tray 10 is shown in a first position sealing about the underside of an orifice plate 12, for example, by sealing against the underside of the orifice plate clamping structure designated 13. It will be appreciated from the foregoing summary of the invention that the orifice plate 12 comprises part of a fluid-jet printing head (not shown), having a fluid distribution bar defining a plenum for supplying fluid to the orifices 14 of orifice plate 12 whereby fluid may flow through the orifice plate into tray 10 and, after start-up, for disposition on the substrate or a catcher, also not shown.

Tray 10 comprises an elongated rectangular box-like structure or tray comprised of side walls 16 and 18, a bottom wall 20, and an intermediate wall 22 disposed between side walls 16 and 18 and above bottom wall 20. Tray 10 rests on a support beam 24, illustrated as a box beam, and suitable clamping plates 26 are disposed at longitudinally spaced positions along the tray 10 and box beam 24, for securing tray 10 to the box beam. Lower wall 20 is elevated from the lower edges of side walls 16 and 18. Suitable connections 28 are provided through the beam 24 and lower wall 20 at opposite ends of the tray 10 for connecting the chamber defined by the tray to a vacuum source, not shown.

The intermediate wall 22 is provided with a plurality of openings 30 at spaced longitudinal positions therealong. As will be apparent to those of ordinary skill, the sizing and spacing of openings 30 can be varied along the length of tray 10 to assure a relatively uniform vacuum pressure along its length. This can be particularly important when lengths on the order of 1.8 meters are involved and the vacuum source is connected at only one location 28. Consequently, it will be appreciated that the tray is divided by intermediate wall 22 into upper and lower chambers. Additionally, the ends of the tray 10 are closed by end walls, only one of which is illustrated at 31, secured to the side walls 16 and 18, respectively, and the bottom wall 20, by bolts. Also, a screen 29 extends from intermediate wall 22 adjacent side wall 18 upwardly and rearwardly toward the opposite side wall 16 for the full length of the tray. Screen 29 serves, in use, to suppress splashback of the fluid which would otherwise mist and wet out the orifice plate.

The top of catcher 10 is open and is defined by a margin 32 along its front and side edges. Margin 32 carries a sealing gasket 33 along its upper surface, gasket 33 preferably being formed of foam rubber. Along the back edge, there is provided a horizontally extending plate 34. Underlying the projection of plate 34 is a support block 36 to which is secured an upright wall 38 which projects upwardly above the upper margin 32 of tray 10. Wall 38 may be secured to the support block 36 and to the inner wall 16 of tray 10 by suitable bolts 40.

Preferably, the materials forming the tray 10 and the back wall 38 are transparent. Such materials may, for example, comprise lucite or other well-known transparent plastic materials.

Preferably, clamps 42 are suitably secured to the rear surface of rear wall 38 and mount a light source, for example, one or more elongated fluorescent light tubes 44. The light source is suitably connected to a source of electricity via power line 46, illustrated in FIG. 1. It will be appreciated that energization of the light source backlights the area above the tray 10 forwardly of the rear wall 38.

Figure 3:
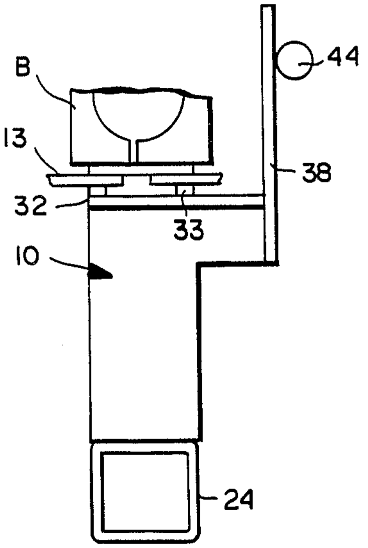
FIGS. 3 through 6 are schematic drawing figures illustrating the movement of the catch tray into various positions relative to the orifice plate during start-up.
Figure 6:
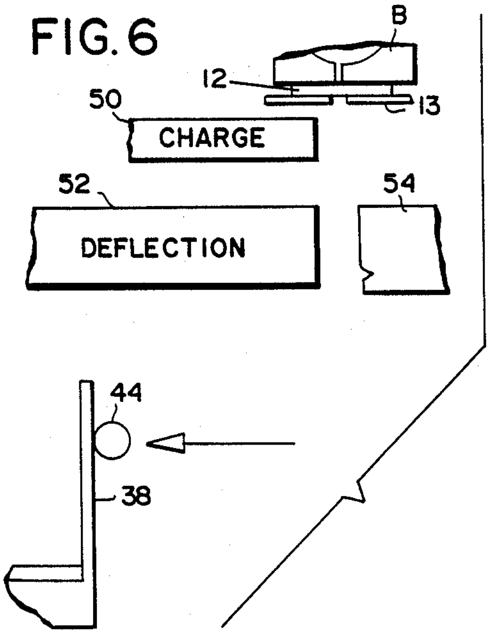

In use, tray 10 is displaced into a first position illustrated in FIGS. 2 and 3 wherein gasket 33 about the opening through the upper end of the tray seals about the underside of orifice plate 12 by sealing against the clamping structure 13. Suitable means may be provided for displacing the tray 10 between the various positions illustrated in FIGS. 3 and 6 and those means are not shown as they are within the ordinary skill of the art.

Upon sealing about the underside of orifice plate 12, a vacuum is applied to the chambers within tray 10 and, hence, to the orifices 14 of orifice plate 12. Air is thus drawn from the plenum, not shown, disposed above orifice plate 12 and into tray 10. Fluid is then introduced into the plenum and supplied to orifices 14 under pressure. It will be appreciated that the fluid under pressure and the vacuum drawn in tray 10 causes fluid streams to issue from orifices 14 along the underside of orifice plate 12. The vacuum provides a pressure gradient through the orifice plate greater than the fluid supply pressure to provide an increased starting force downwardly through the orifice, leading the filament to assume a perpendicular trajectory. This substantially precludes wetting of the orifice plate surface which might otherwise cause deflection of the fluid streams in a direction other than the desired perpendicular direction relative to plate 12. In addition, the vacuum, located as it is, pulls the filaments straight down, rather than at an angle where adjacent filaments might touch and merge. It has been found that if the wall 22 is omitted, the filaments will be directed, not downwardly, but towards the vacuum connection 28.

Figure 4:
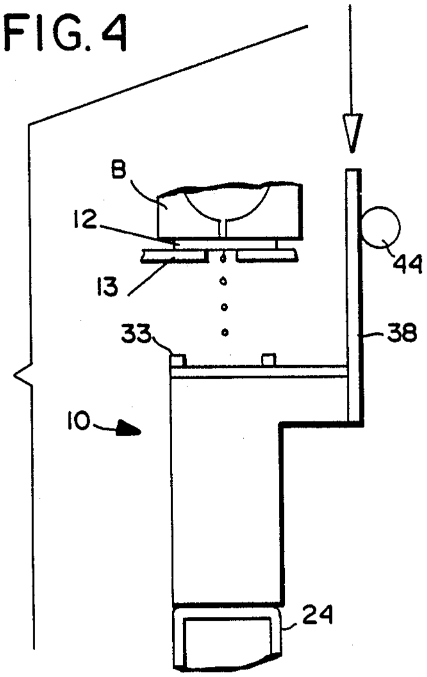

When the fluid has completely filled the plenum and the jet streams are running through the orifices 14, tray 10 is displaced downwardly a predetermined distance, as illustrated in FIG. 4, for example, about one inch. Also, light 44 is energized to backlight the area above the tray and forwardly of rear wall 38. In this manner, the fluid-jet curtain or streams issuing from the orifice plate may be visually observed against the backlit rear wall 38, as illustrated in FIG. 4. Any jet streams that issue at an acute angle, i.e., an angle other than perpendicular, to plate 12, are readily observable against the backlit rear wall 38.

Figure 5:
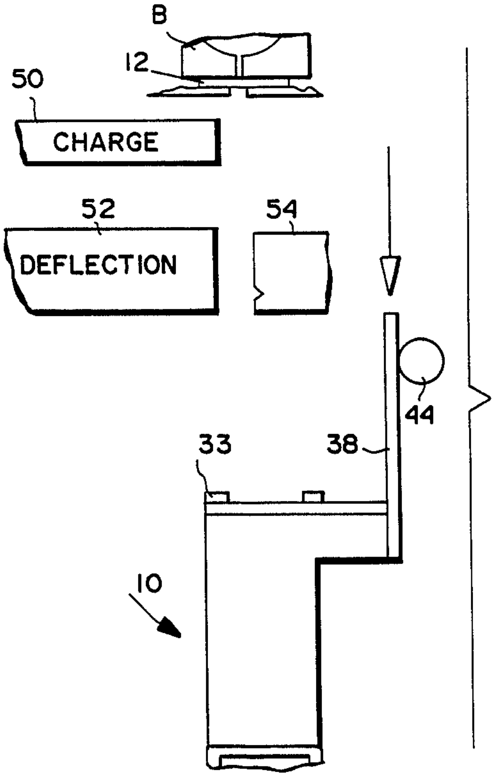

Assuming a good start-up has been effected, tray 10 is then displaced downwardly to a third position illustrated in FIG. 5. By displacing tray 10 downwardly into the third position, charging and deflection electrodes 50 and 52, respectively, as well as a droplet catcher structure 54, may be swung into position below orifice plate 12. Thus, the fluid-jet curtain flows downwardly to one side of the charging and deflection electrodes and between the deflection electrode and the droplet catcher structure for continuation into tray 10. Because of the applied vacuum pressure of screen 29 in tray 20, wetting or misting of the orifice plate with the fluid and splashback of the fluid are suppressed or eliminated in all three positions of tray 10.

Once tray 10 obtains its third position and the electrodes and droplet catcher structure are in place, the electrodes are energized without selectivity such that a "full catch" is provided. That is, all of the droplets emanating from the fluid streams are charged by charging electrode 50 and deflection electrode 52 causes deflection of all of the drops onto the droplet catcher structure 54. Once the "full catch" is in operation, it will be appreciated that none of the droplets from the fluid streams flow into tray 10. The vacuum pressure may then be turned off and tray 10 may be displaced into a fourth, out-of-the-way, position illustrated in FIG. 6. This fourth position of tray 10 permits rolls, not shown, carrying the substrate, e.g., textiles, to be moved into position underneath the orifice plate. At that time, the charge applied to the charging electrode is selected such that certain drops are charged and others are not, whereupon the uncharged droplets may be deposited in the intended manner on the substrate.

It will be appreciated that when tray 10 is displaced to the position illustrated in FIG. 4, and observations are made which indicate that a proper start has not been accomplished, i.e., droplet streams flow at angles other than perpendicular to the orifice plate, the fluid-jet printing apparatus may be restarted. To accomplish this, the catcher may be moved back into the position illustrated in FIG. 3 and the previously described start-up process may be repeated.

However, the number of such restart attempts should be minimal. In tests with a 6" wide array of 1.3 mil orifices 200 to the inch, the array never started without "crooked jets" if the invention was not used. Using the invention, 60% of the time no crooked jets were obtained. Thus, with up to three start-up attempts no crooked jets should be experienced 93.6% of the time (i.e., 60%+24%+9.6%=93.6%).

Thus, it will be appreciated that novel and improved apparatus for starting a fluid-jet device is provided in which the initial flow of fluid-jet streams issuing from the orifice plate in a direction substantially perpendicular to the orifice plate is substantially ensured. Moreover, the foregoing is accomplished with a relatively inexpensive structure which throughout its operation precludes spillage of the fluid issuing from the orifice plate. Also, the tray hereof may be moved into positions compatible with the other mechanisms of the fluid-jet printing device.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a fluid jet printing device of the type having an orifice plate structure including an orifice plate for generating an array of droplet streams generally parallel to one another for disposition on a substrate, apparatus for starting the flow of fluid droplet streams through the orifices of the orifice plate, comprising:

means defining a chamber and a margin about said chamber;

said means being movable between a first position with said margin substantially sealing about the orifice plate structure with the orifices within said margin for receiving the droplet streams flowing through the orifices of the orifice plate and a second position spaced from the orifice plate structure; and means for establishing a pressure gradient across the orifice plate including means for applying a vacuum to the chamber when the chamber-defining means lies in said first position to draw fluid from the opposite side of the orifice plate through the orifices into said chamber to aid in straight, generally parallel, fluid droplet stream formation.

2. Apparatus according to claim 1 including means sealing between the orifice plate structure and the margin about said chamber-defining means when said chamber-defining means lies in said first position.

3. Apparatus according to claim 1 including means for backlighting the area between said chamber-defining means and the orifice plate when the chamber-defining means lies in the second position enabling observation of the fluid droplet streams and the angle of their departure from the orifices of the orifice plate.

4. Apparatus according to claim 3 including a substantially transparent wall, a light source, and means for mounting said light source on said chamber-defining means behind said wall for backlighting the area between the orifice plate and the chamber-defining means to enable visual observation of the fluid droplet streams issuing from the orifice plate.

5. A method for starting the flow of fluid droplet streams through the orifices of an orifice plate in a fluid-jet printing device, comprising the steps of:

(a) providing a fluid droplet catching tray in a position in sealing engagement about the orifices of the orifice plate structure; and (b) generating a pressure gradient across the orifice plate by applying a vacuum to the tray while introducing fluid from the opposite side of the orifice plate through the orifices into said tray whereby the pressure gradient across the orifices acts on the fluid to aid in the formation of straight, generally parallel, fluid droplet streams issuing generally normal to the orifice plate.

6. A method according to claim 5 including the step of moving said tray into a second position spaced from said orifice plate.

7. A method according to claim 6 including the step of backlighting said tray in said second position thereof to enable visual observation of the fluid droplet streams issuing from the orifice plate.

8. A method according to claim 6 wherein said tray in said second position thereof lies closely spaced relative to the orifice plate to enable the tray to catch substantially all fluid droplet streams issuing from the orifice plate in directios other than normal thereto.

9. A method according to claim 8 wherein the tray in said second position thereof is spaced from the orifice plate a distance of about one inch.

10. A method according to claim 5 including the step of introducing fluid into a plenum on the side of the orifice plate opposite the tray subsequent to applying a vacuum to said tray in the first mentioned position thereof.

11. A method according to claim 10 including the step of pressurizing the fluid in the plenum.

12. A method according to claim 6 including moving said tray from said second position into said first position in the event that a predetermined number of the fluid droplet streams issuing from the orifice plate lie at angles other than normal to said plate upon visual observation thereof when the tray is in said second position, and repeating the steps a-b to provide for start-up.

13. A method according to claim 6 including the step of moving said tray to a third position to enable charging and deflection electrodes and a droplet catcher structure to be located in position closely adjacent the fluid droplet streams while the vacuum is applied to the tray and the tray continues to receive fluid from the orifices.

14. A method according to claim 13 including the step of energizing the charging and deflection electrodes to deflect all droplets to the catcher structure, and subsequently moving said tray to a fourth, out-of-the-way, position to enable the substrate to be located in position to receive non-deflected droplets.

15. A method according to claim 5 including introducing fluid into a plenum on the side of the orifice plate opposite the tray, applying a vacuum to the tray in the first mentioned position thereof prior to introducing fluid into the plenum to draw air through the orifices.

16. A method according to claim 6 including maintaining a vacuum pressure in said tray in said second position thereof.

17. A fluid-jet apparatus comprising:

means defining a fluid plenum having a fluid inlet and an orifice plate forming a wall thereof, said orifice plate having an outside face and defining a plurality of orifices through which fluid from said plenum may be ejected to form generally parallel filaments which break up into droplet streams;

means including electrostatic charging and deflection electrodes for controlling the droplets; and means for establishing a pressure gradient across the orifice plate including means for exposing the outside face of said orifice plate to a subatmospheric pressure during start-up of said apparatus whereby the pressure gradient across the orifices assists the formation of the straight, generally parallel droplet streams.

18. Apparatus according to claim 17 wherein the pressure gradient aids the formation of the filaments and their issuance from the orifices in a direction substantially normal to the orifice plate.

19. Apparatus according to claim 17 wherein said exposing means includes meand defining a chamber and a margin about the chamber for sealing about said orifice plate to apply the subatmospheric pressure to the orifices.

20. Apparatus according to claim 17 wherein said orifice plate is elongated and said orifices are spaced along the length of said plate and means carried by said exposing means for substantially uniformly distributing the subatmospheric pressure to the orifices along the length of the plate.

21. Apparatus according to claim 17 wherein said exposing means includes means defining a chamber for receiving filaments from said orifices, and means carried by said chamber defining means for substantially precluding splashback of fluid from said chamber defining means onto said orifice plate.

22. Apparatus according to claim 21 wherein said orifice plate is elongated and said orifices are spaced along the length of said plate, and means carried by said exposing means for substantially uniformly distributing the subatmospheric pressure to the orifices along the length of the plate.

23. Apparatus according to claim 17 wherein said exposing means includes means defining a chamber for applying the subatmospheric pressure to said orifice plate surface and wherein said chamber defining means is removable to return the outside face of said orifice plate for exposure to atmospheric pressure after start-up has been achieved.

* * * * *

UNITED STATES PATENT AND TRADEMARK OFFICE

CERTIFICATE OF CORRECTION

PATENT NO. : 4,831,385

DATED : May 16, 1989

INVENTOR(S) : TIMOTHY H. V. ARCHER; BRUCE W. HALLIDAY

It is certified that error appears in the above-identified patent and that said Letters Patent is hereby corrected as shown below:

Column 5, line 3, "catcher" should read --tray--.

Claim 8, line 5, "directios" should read --directions--.

Claim 19, line 2, "meand" should read --means--.

Claim 22, line 3, "and means" should read --and including means--.

In Figure 2, the numeral "10" and the required arrow have been omitted. The corrected drawing Figure appears as per attached sheet.

Signed and Sealed this

Twenty-ninth Day of May, 1990

*Attest:*

HARRY F. MANBECK, JR.

*Attesting Officer*

*Commissioner of Patents and Trademarks*

UNITED STATES PATENT AND TRADEMARK OFFICE
CERTIFICATE OF CORRECTION

PATENT NO. : 4,831,385

DATED : May 16, 1989

INVENTOR(S) : TIMOTHY H. V. ARCHER; BRUCE W. HALLIDAY

It is certified that error appears in the above-identified patent and that said Letters Patent is hereby corrected as shown below:

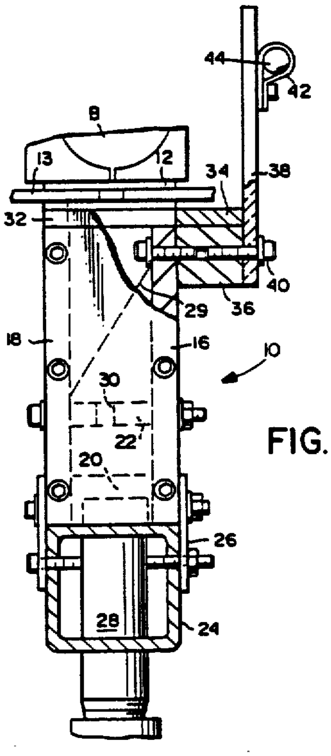

FIG. 2